United States Patent [19]

Harris et al.

[11] Patent Number: 5,824,746
[45] Date of Patent: Oct. 20, 1998

[54] GOLF BALLS INCORPORATING FOAMED METALLOCENE CATALYZED POLYMER

[75] Inventors: Kevin M. Harris, New Bedford; Murali Rajagopalan, South Dartmouth, both of Mass.

[73] Assignee: Acushnet Company, Fairhaven, Mass.

[21] Appl. No.: 658,338

[22] Filed: Jun. 5, 1996

Related U.S. Application Data

[63] Continuation-in-part of Ser. No. 482,514, Jun. 7, 1995, which is a continuation-in-part of Ser. No. 377,553, Jan. 24, 1995, abandoned.

[51] Int. Cl.$^6$ ..................................................... C08L 33/02
[52] U.S. Cl. .................. 525/196; 525/221; 473/351; 473/373; 473/378; 473/385
[58] Field of Search .................................... 525/196, 221; 473/351, 373, 378, 385

[56] References Cited

U.S. PATENT DOCUMENTS

| | | | |
|---|---|---|---|
| 3,572,722 | 3/1971 | Harrison et al. | 273/218 |
| 4,274,637 | 6/1981 | Molitor | 273/235 R |
| 4,431,193 | 2/1984 | Nesbitt | 273/235 R |
| 4,781,383 | 11/1988 | Kamada et al. | 273/228 |
| 4,884,814 | 12/1989 | Sullivan | 273/235 R |
| 5,002,281 | 3/1991 | Nakahara et al. | 273/220 |
| 5,187,013 | 2/1993 | Sullivan | 428/407 |
| 5,312,857 | 5/1994 | Sullivan | 524/400 |
| 5,338,610 | 8/1994 | Sullivan | 428/407 |
| 5,367,028 | 11/1994 | Hamada et al. | 525/221 |
| 5,397,840 | 3/1995 | Sullivan et al. | 525/221 |
| 5,407,998 | 4/1995 | Horiuchi et al. | 525/133 |

FOREIGN PATENT DOCUMENTS

| | | | |
|---|---|---|---|
| 0 633 043 A1 | 1/1995 | European Pat. Off. | A63B 37/00 |
| 2 278 609 | 12/1994 | United Kingdom | A63B 37/12 |

OTHER PUBLICATIONS

Ann M. Thayer, "Metallocene Catalysts Initiate New Era in Polymer Synthesis," Chemical & Engineering News, Sep. 11, 1995, pp. 15–20.
Sentinel Products Update, Metallocene Polyolefin Foam & Cellular Rubber, Summer 1995.
P.S. Chum et al., "Structure/Property Relationships in Polyolefins Made by Constrained Geometry Catalyst Technology," Plastics Engineering, Jun. 1995, pp. 21–23.
Jan H. Schut, "Competition for Metallocences Could Turn Ugly," Plastics World, Jan. 1995, pp. 33–36.
Smith et al., "Applications and Advantages of Flexible Metallocene Polyolefin Foams," SPO '95, 1995, pp. 95–107.
Robert D. Leaversuch, "Metallocene Resins: Is the Revolution for Real?" Modern Plastics, Jun. 1994, pp. 48–50.
Exxon Chemical Co., "Exact Facts," Exxpol Technology, Jun. 1994 pp. 1–8.
T.C. Yu et al., "Polyolefin Modification with EXACT™ Plastomers," SPE RETEC Polyolefins VIII Conference, Feb. 1993.
Matthew H. Naitove, "Novel Rheological Behavior Claimed for New–Tech Polyolefins," Plastics Technology, Nov. 1992, pp. 23 & 25.

*Primary Examiner*—Thomas R. Weber
*Attorney, Agent, or Firm*—Pennie & Edmonds LLP

[57] ABSTRACT

The disclosed invention provides novel golf ball compositions which contain olefinic based ionomers and non-ionic olefinic copolymers produced by use of metallocene catalysts. These compositions exhibit improved mechanical properties such as tensile and flexural properties, and can be foamed or unfoamed. Golf balls that employ at least one layer of these blends in any of the golf ball cover, core, or a mantle situated between the cover and the core provide ball properties and performance similar to and in some cases better than the state of the art ionomer based golf balls.

31 Claims, 2 Drawing Sheets

GOLF BALLS INCORPORATING FOAMED METALLOCENE CATALYZED POLYMER

This application is a continuation-in-part of U.S. application Ser. No. 08/482,514, filed on Jun. 7, 1995, now pending which is a continuation-in-part of U.S. application Ser. No. 08/377,553 filed Jan. 24, 1995 (now abandoned).

FIELD OF THE INVENTION

The present invention relates to golf balls and, in particular, to golf balls having at least one layer comprising at least one polyolefin polymer produced using a single-site metallocene catalyst in the polymerization process. The metallocene polymer may be mixed with an ionomer to form a blend, and may be foamed or unfoamed. The layer may be located in any of the cover or core of the ball or in a mantle layer located between the cover and the core.

BACKGROUND OF THE INVENTION

Three-piece, wound golf balls with balata covers are preferred by most expert golfers. These balls provide a combination of distance, high spin rate, and control that is not available with other types of golf balls. However, balata is easily damaged in normal play, and, thus, lacks the durability required by the average golfer.

In contrast, amateur golfers typically prefer a solid, two-piece ball with an ionomer cover, which provides a combination of distance and durability. Because of the hard ionomer cover, these balls are almost impossible to cut, but also have a very hard "feel", which may golfers find unacceptable, and a lower spin rate, making these balls more difficult to draw or fade. The differences in the spin rate can be attributed to the differences in the composition and construction of both the cover and the core.

Many attempts have been made to produce a golf ball with the control and feel of a wound balata ball and the durability of a solid, two-piece ball, but none have succeeded totally. For example, U.S. Pat. No. 4,274,637 to Molitor discloses two- and three-piece golf balls having covers completely or partially formed from a cellular polymeric material to improve backspin, but does not provide any examples that compare the spin rates of the disclosed golf balls with those of prior art balls.

U.S. Pat. No. 5,002,281 to Nakahara et al. discloses a three-piece solid golf ball having an ionomer cover and a solid core consisting of a soft inner core and a hard outer shell, where the difference in the hardness of the two parts of the core is at least 10 on the JIS-C scale.

Similarly, U.S. Pat. No. 4,781,383 discloses a solid, three-piece golf ball, having an ionomer cover and a core with inner and outer layers, where the inner layer has a diameter of 24 to 29 mm and a Shore D hardness of 15 to 30, and the outer layer has a diameter of 36 to 41 and a Shore D hardness of 55 to 65. The percentage of the ball surface which contacts the club face when the ball is struck is 27 to 35%.

European Patent Application 0 633 043 discloses a solid, three-piece golf ball with an ionomer or balata cover, a center core, and an intermediate layer. The center core has a diameter of at least 29 mm and a specific gravity of less than 1.4. The intermediate layer has a thickness of at least 1 mm, a specific gravity of less than 1.2, and a hardness of at least 85 on the JIS-C scale.

Copending application no. 08/482,518, now pending employs compressible materials, i.e., gases, in the core of a solid construction golf ball to simulate the effects of trapped air in a wound ball.

None of these disclosures utilizes the unique physical properties of metallocene polymers, i.e., polymers produced using single-site metallocene catalysts, which produce polymers with a narrow molecular weight distribution and uniform molecular architecture. That is, metallocene catalysts provide polymers in which the order and orientation of the monomers in the polymer, and the amount and type of branching is essentially the same in each polymer chain.

The narrow molecular weight distribution and uniform molecular architecture provides metallocene polymers with properties that are not available with conventional polymers, and allow polymers to be produced having unique properties that are specifically tailored to a particular application. The desired molecular weight distribution and the molecular architecture are obtained by the selection of the appropriate metallocene catalyst and polymerization conditions. Moreover, foamed polyolefin metallocene polymers, which can be thermoformed, and provide the physical properties of rubber with the fabrication ease of polyethylene, recently became available commercially. There is no known prior art disclosure of the use of metallocene polymers in golf balls.

In addition, while different blend combinations of species of one variety of polymer, such as ionomers, have been successfully used in the prior art, different polymers, such as ionomers and balata or other non-ionic polymers have not been successfully blended for use in golf ball covers. In general, prior art blends of polymer components are immiscible or incompatible unless strong interactions are present between the polymer components in the mixture, such as those observed between ionomers and polymers containing carboxylic acid groups. In particular, this lack of compatibility exists when an ionomer is blended with a polyolefin homopolymer, copolymer, or terpolymer that does not contain ionic, acidic, basic, or other polar pendant groups, and is not produced with a metallocene catalyst. These mixtures often have poor tensile strength, impact strength, and the like. Hence, the golf balls produced from these incompatible mixtures will have inferior golf ball properties such as poor durability, cut resistance, and so on.

In this regard, U.S. Pat. No. 5,397,840 discloses golf ball covers including a blend of "ionic copolymers" and "non-ionic copolymers". However, the "ionic copolymers" are defined as copolymers of an $\alpha$-olefin and a metal salt of an $\alpha,\beta$-unsaturated carboxylic acid, and the "non-ionic copolymers" are copolymers or terpolymers containing ethylene or propylene and acrylic or methacrylic acid monomers. Therefore, strong interactions exist between the metal salts of the "ionic copolymers" and the acrylic or methacrylic acid monomers of the "non-ionic copolymers" that allow compatible blends to be formed. These interactions do not exist in prior art blends of ionomers and polymers that are truly non-ionic or nonpolar, in particular, those polymers produced with a process that does not involve the use of a metallocene catalyst.

Therefore, there is a need in the golf ball art for a golf ball incorporating metallocene polymers and blends of metallocene polymers and other polymers, such as ionomers, and in particular, foamed metallocene polymers in golf balls. The inclusion of foamed and unfoamed metallocene polymers and metallocene polymer blends will allow highly durable golf balls to be produced with virtually any combination of feel and spin rate.

SUMMARY OF THE INVENTION

The present invention relates to golf balls, and, in particular, to golf balls having at least one layer formed of a metallocene polymer blend, comprising from about 1 to about 100 phr of at least one metallocene polymer and from about 99 to 0 phr of at least one ionomer. The layer may form at least a portion of any of the cover, core or mantle of the golf ball, where the mantle is situated between the cover and the core. Any of the core, cover, and mantle of the golf balls of the invention can be formed of one layer or a plurality of layers, as that term is defined herein. In the preferred embodiment, the layer has a foamed structure. Generally, the metallocene polymer has a flexural modulus of from about 500 psi to 200,000 psi, and the ionomer has a flexural modulus of from about 50 psi to about 150,000 psi. For a metallocene polymer blend having a foamed structure, the preferred flexural modulus ranges from about 1000 to 150,000 psi.

For golf ball covers having a layer of metallocene polymer blend with a foamed structure, the layer preferably has a Shore D hardness of from about 15 to about 80 and a thickness of from about 0.005 to 0.125 inch.

Generally, for golf ball cores having a layer of metallocene polymer blend with a foamed structure, the layer generally has a Shore D hardness of from about 15 to about 80 and a thickness of from about 0.005 to 0.125 inch. The core preferably has a diameter of from about 1 to 1.63 inch. Where the metallocene polymer blend layer is situated in an outer portion of the core, the core may comprises a liquid center or a solid polymeric center.

For golf balls comprising a cover and a core and a mantle situated between the cover and the core, where the mantle has a layer of metallocene polymer blend layer with a foamed structure, the layer preferably has a Shore D hardness of from about 15 to about 80 and a thickness of from about 0.005 to 0.125 inch. Cores in golf balls according to the invention for use with mantles may comprise a liquid or solid center wrapped in elastomeric windings. Preferably, in golf balls with such mantles, the core has a diameter of from about 1 to 1.63 inch and the cover has a thickness of from about 0.005 to 0.125 inch.

Preferably, the metallocene polymer is polyethylene or a copolymers of ethylene with butene, hexene, octene, or norbornene. Pendant groups may be also added to metallocene polymers by post-polymerization reactions to modify physical or chemical properties of the polymer. Metallocene polymers useful with the golf balls of the invention include metallocene polymers of the formula:

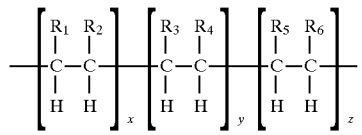

wherein

R$_1$ is hydrogen;

R$_2$ is hydrogen or lower alkyl selected from the group consisting of CH$_3$, C$_2$H$_5$, C$_3$H$_7$, C$_4$H$_9$, and C$_5$H$_{11}$;

R$_3$ is hydrogen or lower alkyl selected from the group consisting of CH$_3$, C$_2$H$_5$, C$_3$H$_7$, C$_4$H$_9$, and C$_5$H$_{11}$;

R$_4$ is selected from the group consisting of H, CH$_3$, C$_2$H$_5$, C$_3$H$_7$, C$_4$H$_9$, C$_5$H$_{11}$, C$_6$H$_{13}$, C$_7$H$_{15}$, C$_8$H$_{17}$, C$_9$H$_{19}$, C$_{10}$H$_{21}$, and phenyl, in which from 0 to 5 H within R$_4$ can be replaced by substituents selected from the group consisting of COOH, SO$_3$H, NH$_2$, F, Cl, Br, I, OH, SH, silicone, lower alkyl esters and lower alkyl ethers, with the proviso that R$_3$ and R$_4$ can be combined to form a bicyclic ring;

R$_5$ is hydrogen, lower alkyl including C$_1$–C$_5$, carbocyclic, aromatic or heterocyclic;

R$_6$ is hydrogen, lower alkyl including C$_1$–C$_5$, carbocyclic, aromatic or heterocyclic; and wherein x ranges from 99 to 50 weight per cent of the polymer, y ranges from 1 to 50 weight per cent of the polymer and z ranges from 0 to 49 weight per cent of the polymer.

The use of foamed metallocene polymer also allows the golf ball designer to adjust the density or mass distribution of the ball to adjust the angular moment of inertia, and, thus, the spin rate and performance of the ball. Foamed materials also offer a potential cost savings due to the reduced use of polymeric material. Where at least a portion of the core is formed from a foamed metallocene polymer blend, a density increasing filler material can be added to the cover or the mantle to distribute the mass of the ball towards the outer surface and increase the angular moment of inertia. Similarly, where the layer forms at least a portion of the cover, the density increasing filler material can be added to the core to decrease the angular moment of inertia. Alternatively, where the layer forms at least a portion of the mantle, a density increasing filler material can be added to either the cover or the core.

Preferably, a golf ball according to the invention comprises a cover and a core and a mantle situated between the cover and the core, wherein at least one of the cover, the core, and the mantle comprises at least one layer comprising a metallocene polymer blend, and the metallocene polymer blend comprises from about 1 to about 100 phr of at least one metallocene polymer, such as those described above, and from about 99 to 0 phr of at least one ionomer. Most preferably, the layer has a foamed structure, and the layer forms at least a portion of the mantle.

DETAILED DESCRIPTION OF THE INVENTION

As used herein, the terms "metallocene polymer" and "metallocene catalyzed polymer" include any polymer, copolymer, or terpolymer, and, in particular, any polyolefin, formed using a metallocene catalyst. The terms "metallocene polymer blend" and "metallocene catalyzed polymer blend" include polymer blends in which the portion of metallocene polymer can range from about 1 to 100 phr (parts per hundred), based on 100 parts polymer in the blend. In addition, the term "layer" includes any generally spherical portion of a golf ball or golf ball core, center, or mantle, including one-piece cores and one-piece balls. A mantle is defined herein as a portion of the golf ball that occupies the volume between the cover and the core. Of course, as one of ordinary skill in the art would recognize, any of the core, cover, and mantle of the golf balls of the invention can be formed of one layer or a plurality of layers, as that term is defined herein.

The present invention relates to golf balls including at least one layer comprising one or more metallocene polymers, which may be blended with at least one ionomer.

The metallocene polymer blends of the invention typically comprise a compatible blend of about 1 to 100 phr of at least one metallocene polymer and about 99 to 0 phr of at least one ionomer. The blends may be foamed during molding by any conventional foaming or blowing agent. In addition, foamed metallocene polymers may be thermoformed, and, thus can be compression molded. Therefore, either injection molding or compression molding may be used to form a layer of foamed metallocene polymer in the cover, core, or mantle of a golf ball according to the invention. Metallocene polymers and metallocene polymer blends are resilient, easily processed materials that are less expensive than ionomers, and allow highly durable golf balls to be produced with virtually any combination of feel and spin rate.

Golf balls according to the invention may incorporate cores comprising metallocene polymer blends or conventional materials. Metallocene polymer blend cores may be either one-piece, comprising a single piece of foamed or unfoamed metallocene polymer blend, or multi-piece, comprising a liquid or solid core or center and one or more layers in which any of the center or the layers may comprise a foamed or unfoamed metallocene polymer blend.

Figure 1:
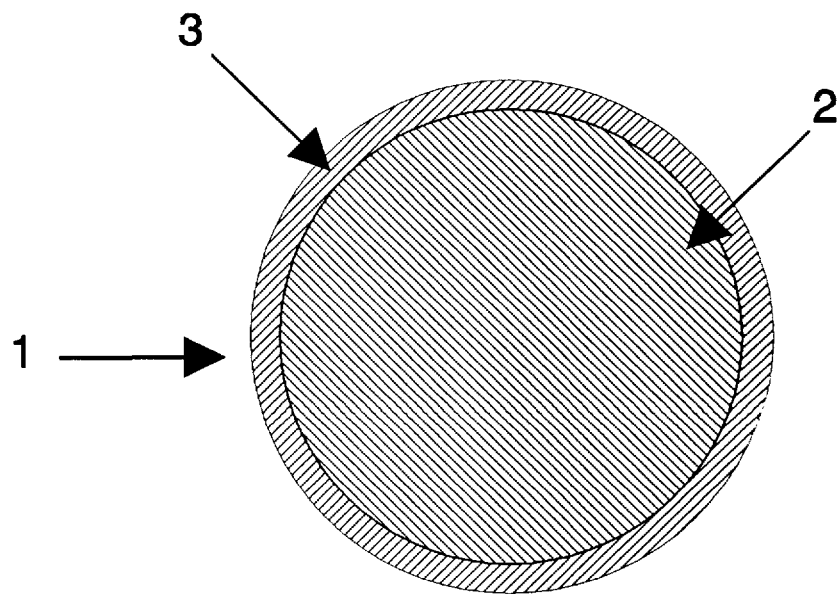
FIG. 1 is a cross-sectional view of a two-piece golf ball according to the invention with a one-piece core.

For example, FIG. 1 illustrates a golf ball according to the invention with a one-piece core. Golf ball 1 comprises a core 2 and a cover 3, wherein either of core 2 or cover 3 incorporates at least one layer comprising a foamed or unfoamed metallocene blend.

Figure 2:
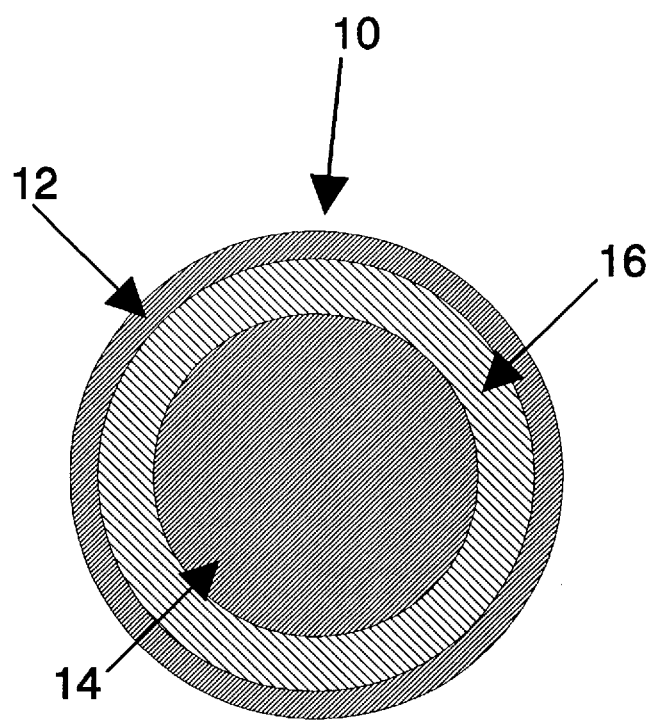
FIG. 2 is a cross-sectional view of a two-piece golf ball according to the invention incorporating a multi-layer core.

Similarly, FIG. 2 illustrates a golf ball according to the invention incorporating a multi-piece core. Golf ball 10 comprises a cover 12, a core having a center 14 and at least one additional core layer 16. Any of the cover 12, center 14, or core layer 16 may incorporate at least one layer of a foamed or unfoamed metallocene blend.

Conventional materials useful in centers, cores, or core layers of the golf balls of the invention include, but are not limited to, compositions having a base rubber, a crosslinking agent, and a filler. The base rubber typically includes natural or synthetic rubbers. A preferred base rubber is 1,4-polybutadiene having a cis-structure of at least 40%. Natural rubber, polyisoprene rubber and/or styrene-butadiene rubber may be optionally added to the 1,4-polybutadiene. Crosslinking agents include metal salts of unsaturated fatty acids, such as zinc or magnesium salts acrylic or methacrylic acid. The filler typically includes materials such as zinc oxide, barium sulfate, silica, calcium carbonate, zinc carbonate and the like. Golf balls of the invention may also have conventional wound cores.

Figure 3:
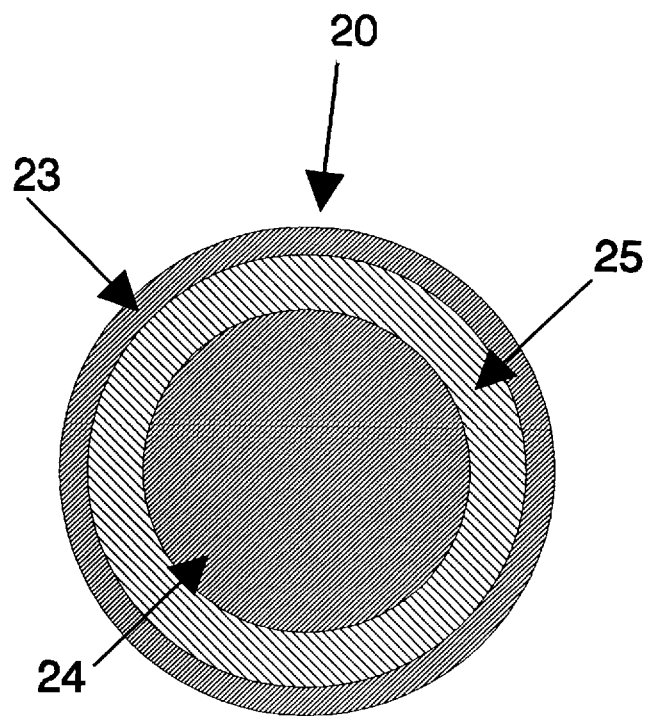
FIG. 3 is a cross-sectional view of a golf ball according to the invention incorporating a mantle layer between the cover and the core.

Golf balls of the invention may also include a mantle layer, preferably comprising a least one layer of a foamed or unfoamed metallocene polymer blend, situated between the cover and the core. A golf ball incorporating a mantle layer is illustrated in FIG. 3, which depicts golf ball 20, having cover 23, core 24, and a mantle layer 25 situated between the cover and the core. Any of cover 23, core 24, and mantle layer 25 may incorporate at least on layer of a foamed or unfoamed metallocene blend. Moreover, core 24 may be a one-piece core, a multi-layer core, or a wound core.

Golf balls according to the invention may incorporate cover layers comprising foamed or unfoamed metallocene polymer blends or conventional materials, including balata and ionomer cover stock. Metallocene polymer blend cover layers according to the invention may be used with conventional solid or wound cores, as well as those comprising metallocene polymer blends.

The narrow molecular weight distributions of metallocene polymers provide more uniform compositions and improved tensile properties when compared to polyolefins polymerized with conventional catalysts. When a layer of foamed metallocene polymer blend is used in a golf ball cover or mantle, the ball has a softer feel than balls using hard a ionomer, and is more deformable. The increased deformation of the cover and outer layers of the ball provides improved control due to the increased "bite" on the clubface when the ball is struck, which prevents or reduces sliding of the ball up the clubface, and allows more energy to be imparted directly to the core at impact, providing a greater initial velocity. The improved control and feel are similar to those obtained using a soft balata cover without the decrease in durability that is typically associated with balata.

The use of foamed metallocene polymer also allows the golf ball designer to adjust the density or mass distribution of the ball to adjust the angular moment of inertia, and, thus, the spin rate and performance of the ball. Foamed materials also offer a potential cost savings due to the reduced use of polymeric material.

Metallocene polymers useful in the golf balls of the invention are available commercially, and can be subjected to post-polymerization reactions to provide metallocene polymers with various pendant groups. Examples of metallocene polymers useful in the invention include, but are not limited to homopolymers of ethylene and copolymers of ethylene and a second olefin, preferably, propylene, butene, hexene, octene, and norbornene. Generally, the invention includes golf balls having at least one layer comprising a blend that includes at least one metallocene polymer having the formula:

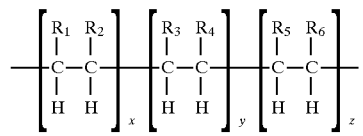

wherein
R$_1$ is hydrogen, branched or straight chain alkyl such as methyl, ethyl, propyl, butyl, pentyl, hexyl, heptyl, and octyl, carbocyclic, aromatic or heterocyclic;

R$_2$ is hydrogen, lower alkyl including C$_1$–C$_5$; carbocyclic, aromatic or heterocyclic R$_3$ is hydrogen, lower alkyl including C$_1$–C$_5$, carbocyclic, aromatic or heterocyclic;

R$_4$ is selected from the group consisting of H, C$_n$H$_{2n+1}$, where n=1 to 18, and phenyl, in which from 0 to 5 H within R$_4$ can be replaced by substituents selected from the group consisting of COOH, SO$_3$H, NH$_2$, F, Cl, Br, I, OH, SH, silicone, lower alkyl esters and lower alkyl ethers, with the proviso that R$_3$ and R$_4$ can be combined to form a bicyclic ring;

R$_5$ is hydrogen, lower alkyl including C$_1$–C$_5$, carbocyclic, aromatic or heterocyclic;

R$_6$ is hydrogen, lower alkyl including C$_1$–C$_5$, carbocyclic, aromatic or heterocyclic; and wherein x, y and z are the relative percentages of each co-monomer. The number x can range from 1–99 percent or more preferably from 10–70 percent and most preferred, from about 10–50 percent. The number y can be from 99–1 percent, preferably, from 90–30 percent, or most preferably, 90–50 percent. The number z can range from 0 to 49 percent.

In the preferred metallocene copolymer, R$_1$ is hydrogen or lower alkenyl, R$_2$ is hydrogen or alkyl, including carbon chains having from 1 to 10 carbon atoms, R is hydrogen or lower alkyl or alkenyl such as carbon chains having 1–10 carbon atoms, and $R_4$ is a lower alkyl group having from 1–10 carbon atoms. For terpolymers, where z is not zero, $R_5$ is preferably hydrogen or lower alkyl or alkenyl such as carbon chains having 1–10 carbon atoms, and $R_6$ is a lower alkyl group having from 1–10 carbon atoms. In the most preferred copolymer, $R_1$ and $R_2$ are hydrogen, $R_4$ is hydrogen, methyl, ethyl, propyl, butyl, pentyl, hexyl, heptyl or octyl, and $R_4$ is a straight carbon chain having 6 carbon atoms. For terpolymers, $R_5$ is most preferably hydrogen, methyl, ethyl, propyl, butyl, pentyl, hexyl, heptyl or octyl, and $R_6$ is a straight carbon chain having 6 carbon atoms.

The subject metallocene copolymers can be random or block copolymers. Additionally, the subject metallocene polymers may be isotactic, syndotactic or atactic. The pendant groups creating the isotactic, syndotactic or atactic polymers are chosen to determine the interactions between the different polymer chains making up the resin to control the final properties of the resins used in golf ball covers.

As used herein, the phrase branched or straight chain alkyl means any substituted or unsubstituted acyclic carbon-containing compounds, including alkanes, alkenes and alkynes. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, propyldiene, butylene, butyldiene, pentene, hexene, heptene, octene, norbornene, nonene, decene and the like. The ordinary skilled artisan is familiar with numerous linear and branched alkyl groups, which are within the scope of the present invention.

In addition, such alkyl groups may also contain various substituents in which one or more hydrogen atoms has been replaced by a functional group. Functional groups include, but are not limited to hydroxyl, amino, carboxyl, sulfonic amide, ester, ether, phosphates, thiol, nitro, silane and halogen (fluorine, chlorine, bromine and iodine), to mention but a few.

As used herein, substituted and unsubstituted carbocyclic means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom. For example, in a specific embodiment, $R_2$ is cyclohexanol.

As used herein, substituted and unsubstituted aryl groups means a hydrocarbon ring bearing a system of conjugated double bonds, typically comprising $4n+2\pi(\text{pi})$ ring electrons, where n is an integer. Examples of aryl groups include, but are not limited to phenyl, naphthyl, anisyl, toluyl, xylenyl and the like. According to the present invention, aryl also includes heteroaryl groups, e.g., pyrimidine or thiophene. These aryl groups may also be substituted with any number of a variety of functional groups. In addition to the functional groups described above in connection with substituted alkyl groups and carbocyclic groups, functional groups on the aryl groups can include nitro groups.

As mentioned above, $R_1$ and $R_2$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, 2,2-methylphenylbutyl.

The metallocene copolymers useful in the present invention are commercially available under the trade name AFFINITY® polyolefin plastomers and ENGAGE® polyolefin elastomers by Dow Plastics Company. Other commercially available metallocene polymers can be used such as Exxon's Exact® and Dow's Insight® line of resins which have superior flexibility and clarity as well as toughness. The Exact® and Insight® line of polymers also have novel rheological behavior in addition to their other properties as a result of using a metallocene catalyst technology. Metallocene polymers are also available from Sentinel Products Corporation of Hyannis, Mass., as foamed sheets for compression molding and in unfoamed pelletized form suitable for injection molding. The foamed metallocene polymers sheets are available in thicknesses ranging from about 0.027 to 0.625 inches (0.069 to 0.159 cm). Closed cell bun stock is also available in thicknesses of up to 4 inches (10.2 cm).

The metallocene polymer blend golf ball compositions of the present invention comprise compatible blends of at least one metallocene polymer and at least one ionomer that are formed using blending methods well known in the art. In particular, the metallocene polymer blends comprise compatible blends of metallocene polymers and ionomers, such as ethylene methacrylic acid ionomers, and ethylene acrylic acid ionomers, and their terpolymers, sold commercially under the trade names SURLYN® and IOTEK® by DuPont and Exxon respectively. The metallocene polymer blends useful in the golf balls of the invention can also include other polymers, such as poly(ethylethylene), poly(heptylethylene), poly(hexyldecylethylene), poly(isopentylethylene), poly(1,1-dimethyltrimethylene), poly(1,1,2-trimethyltrimethylene), poly(butyl acrylate), poly(4-cyanobutyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly[1,1-bis(trifluoromethoxy)difluoroethylene], poly(methoxyethylene), poly(pentyloxyethylene), poly(1,1-dichloroethylene), poly(cyclopentylacetoxyethylene), poly(4-[(2-butoxyethoxy)methyl]styrene), poly(4-dodecylstyrene), poly(4-tetradecylstyrene), poly(phenetylmethylethylene), poly[oxy(allyloxymethyl)ethylene], poly[oxy(ethoxymethyl)ethylene], poly(oxyethylethylene), poly(oxytetramethylene), poly(oxytrimethylene), poly(oxycarbonylpentamethylene), poly(oxycarbonyl-3-methylpentamethylene), poly(oxycarbonyl-1,5-dimethylpentamethylene), poly(oxy-2,2,3,3,4,4-hexafluoropentamethyleneoxyadipoyl), poly[oxy(methyl)-3,3,3trifluoropropylsilylene-3p3-difluoropentamethylene (methyl) 3,3,3-trifluoropropylsilylene], poly(silanes) and poly(silazanes), main-chain heterocyclic polymers and poly(furan tetracarboxylic acid diimides) as well as the classes of polymers to which they belong.

The preferred golf ball compositions comprise one or more ionomer resins having a flexural modulus of from about 50 psi to about 150,000 psi and a metallocene copolymer of an olefin having a flexural modulus of from about 500 psi to 200,000 psi. In a most preferred embodiment of the present invention EXACT® 4033 is combined with IOTEK® 7030 or SURLYN® 7940 to form combination blends suitable for use in golf ball centers and cover, core, and mantle layers.

The amounts of polymers used in the golf ball compositions of the invention can vary from 1 to 100 phr of the metallocene polymers to 99 to 0 phr of other polymers or ionomers, preferably, 95 to 5 phr metallocene polymers and 5 to 95 phr ionomer or other polymer. Most preferred is from about 95 to 30 phr metallocene polymer and from about 5 to 70 phr of other polymer or ionomer.

Further compositions may also be added to the compatible blends of the invention, such as, for example, coloring agents, reaction enhancers, crosslinking agents, dyes, lubricants, fillers, excipients, process aids and other compounds commonly added to polymeric materials and/or golf ball covers.

The present invention relates to golf balls of any size. While USGA specifications limit the size of a competition golf ball to more than 1.68 inches (4.27 cm) in diameter, golf balls of any size can be used for leisure golf play. The preferred diameter of the golf balls is from about 1.68 inches to about 1.8 inches (4.57 cm). The more preferred diameter is from about 1.68 inches to about 1.76 inches (4.47 cm). A diameter of from about 1.68 inches to about 1.74 inches (4.42 cm) is most preferred, however diameters anywhere in the range of from 1.7 to about 1.95 inches (4.3 to 4.95 cm) can be used. Oversize golf balls above about 1.76 inches to golf balls having diameters as big 2.75 inches (7 cm) are also within the scope of the present invention.

Metallocene polymer blend layers may be produced in golf balls in accordance with the present invention by injection molding or compression molding a layer of metallocene polymer blend material about a previously formed center or core, cover, or mantle layer. Cores comprising a metallocene polymer blend may also be formed directly by injection molding or compression molding. When the layer or core is injection molded, a physical or chemical blowing or foaming agent may be included to produce a foamed layer. Blowing or foaming agents useful in forming foamed metallocene polymer blends include, but are not limited to organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenylmethyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the blend during the injection molding process.

In a further embodiment, foamed metallocene polymer blends may be formed by blending microspheres with the metallocene polymer blend either during or before the molding process. Polymeric, ceramic, metal, and glass microspheres are useful in the invention, and may be solid or hollow and filled or unfilled. Microspheres up to about 1000 micrometers in diameter are useful in the metallocene polymer blends of the invention.

For compression molded metallocene polymer blend layers, half-shells made by injection molding a metallocene polymer blend in a conventional half-shell mold or by compression molding commercially available sheets of foamed metallocene are used. The half-shells are placed about a previously formed center or core, cover, or mantle layer, and the assembly is introduced into a compression molding machine, and compression molded at about 250° to 400° F. The molded balls are then cooled while still in the mold, and finally removed when the layer of metallocene polymer blend is hard enough to be handled without deforming. Additional core, mantle, and cover layers are then molded onto the previously molded layers, as needed, until a complete ball is formed.

After the final cover layer of the ball has been molded, the ball undergoes various conventional finishing operations such as buffing, painting and stamping.

Blending of the metallocene polymer and ionomer resins is accomplished in a conventional manner using conventional equipment. Good results have been obtained by mixing the metallocene polymer and ionomer resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding or for molding flowable metallocene polymer blend using a retractable-pin mold. Such machines are conventional.

These and other aspects of the present invention may be more fully understood by reference to the following examples.

While these examples are meant to be illustrative of golf balls made according to the present invention, the present invention is not meant to be limited by the following examples. All parts are by weight unless otherwise specified.

Formulations containing the components IOTEK® 7030 (a copolymer of ethylene and acrylic acid neutralized by zinc oxide) with EXACT® 4033 (a metallocene copolymer of ethylene with 1-butene) and the compatibilizer ATX 320® were developed according to the present invention.

Table I summarizes the physical properties of these components used in the blends.

TABLE I

Physical Properties of various components used in the blends

| Property | Iotek 7030 | Escor ATX 320 | Exact 4033 | Surlyn 7940 | Surlyn 8320 |
|---|---|---|---|---|---|
| Hardness (Shore-D or A) | 55 D | 83 A | 85 A | 68 D | 84 A |
| Tensile Strength, psi | 3500 | 1800 | 3000 | 3800 | 3100 |
| Tensile strain at break, % | 395 | >800 | 620 | 285 | 770 |
| Tensile modulus, psi | NA | 1300 | 720 @300% strain | NA | NA |
| Flexural modulus, psi | 16,000 | 3700 | 3300 | 61000 | 2800 |

Tensile and flexural test samples are produced by injection molding of the formulations by following a standard operating procedure. The test samples are annealed in an air circulating oven at 140° F. for 24 hours, followed by conditioning at room temperature for seven days before testing. Both tensile and flexural measurements were carried out by following ASTM D638 and D790 procedures, respectively.

Golf ball covers are produced by injection molding by following a routine molding procedure. Cores or mantle layers and cores measuring about 1.4 to 1.58 inch (3.5 to 4 cm) diameter are used to make golf balls by compression molding of the cover composition about the core or mantle layer and core.

After completion of the ball molding process, the balls are buffed, sand blasted and painted for evaluation. Hardness, PGA compression, spin, velocity, shear resistance, durability using a dual pendulum, ink and paint durability tests are performed on the finished balls. These results are shown in Table III.

The tensile, flexural, hardness and flow properties of the blends based on IOTEK® 7030 and EXACT® 4033 are summarized in Table II. Properties from blends 1 and 2 were used as a control. Although Shore-D hardness and tensile modulus decreases as EXACT® 4033 level increases for blend 5, tensile strength surprisingly was much higher than for blends 2 through 4. Also, a significant increase in the percent strain at break value was obtained for blend 5.

Blends of polymers including EXACT® 4033 and IOTEK® 7030 ionomer, exhibit excellent properties when used in golf ball covers which is unexpected since EXACT® 4033 material is hydrophobic whereas IOTEK® 7030 is hydrophilic. Although Shore-D hardness decreases with increases in EXACT® 4033 level in the blends, surprisingly both initial velocity and coefficient of restitution (COR) remain constant for blends 3 through 5. See Table III. These results are unusual since initial velocity tends to decrease as hardness decreases.

TABLE II

Comparison of various physical properties of blends baaed on Iotek ® 7030 ® with Exact ® 4033.

| Ingredients | Blend 1 | Blend 2 | Blend 3 | Blend 4 | Blend 5 |
|---|---|---|---|---|---|
| Iotek 7030 | 100 | 90 | 80 | 70 | 50 |
| ATX 320 | — | 10 | 10 | 10 | 10 |
| Exact 4033 | — | — | 10 | 20 | 40 |
| White concentrate | 5 | 5 | 5 | 5 | 5 |
| Physical Properties | | | | | |
| Hardness (Shore-D) | 58 | 56 | 60 | 50 | 45 |
| Tensile strength at break, psi | 2701 | 2453 | 2174 | 2383 | 2899 |
| Tensile strain at break, % | 393 | 441 | 412 | 556 | 875 |
| Tensile modulus, kpsi | 17.7 | 15.3 | 14.4 | 12.2 | 7.4 |
| Flexural modulus, kpsi | 36.2 | 32.3 | 29.9 | 26.4 | 21.7 |
| Melt flow index at 185° C., g/10 min | 5.3 | 6.2 | 5.5 | 4.3 | 3.1 |

Note: Tensile properties were measured from the ball covers.

In general, in the golf ball art, durability decreases as the non-ionic olefin component increases in an ionomer blend. Also, as mentioned above, durability of blends of ionomers with a homopolymer such as polyethylene is poor (failed after 5 to 10 hits) due to incompatibility of these components. However, the present invention unexpectedly shows that it is possible to obtain improved durability for golf ball cover compositions containing EXACT® 4033 in various compositions.

A significant increase in the spin rate from the driver and 5-iron was obtained for balls which contain blends of metallocene polymer and ionomers in the cover compositions.

TABLE III

Comparison of various golf ball properties of blends based on Iotek 7030 ® with Exact ® 4033.

| Physical and Ball Properties | Blend 1 | Blend 2 | Blend 3 | Blend 4 | Blend 5 |
|---|---|---|---|---|---|
| Hardness (Shore-D) | 65 | 60 | 60 | 57 | 55 |
| PGA comparison | 104 | 103 | 102 | 101 | 100 |
| Spin rate from the driver, rpm | 3264 | 3254 | 3404 | 3526 | 3885 |
| Spin rate from the 5-iron, rpm | 7653 | 7807 | 8100 | 8197 | 9103 |
| Initial velocity, ft/s | 252.7 | 252.7 | 252.6 | 252.6 | 252.7 |
| Coefficient of restitution | 0.802 | 0.801 | 0.799 | 0.804 | 0.800 |
| Durability at room temperature, #hits to 50% failure | 150 | 400 | 200 | 250 | 400 |

More recently, a study was initiated to displace the low modulus Surlyn® 8320 ionomer by EXACT® 4033 in the blend formulations as described in Table IV; a blend 8 containing 9.5 wt percent of ATX 320® was included in this study in order to find out whether the ATX 320® is necessary to achieve acceptable mechanical and ball properties.

Tensile strength and percent strain at break increases for blends containing the EXACT® 4033 yet still has a higher tensile modulus than the low modulus SURLYN® 8320 blend as indicated in Table IV. This behavior is unexpected.

TABLE IV

Comparison of various physical properties of cover blends based on Surlyn 7940 ® with Surlyn ® 8320 and Exact ® 4033

| Ingredients | Blend 6 | Blend 7 | Blend 8 |
|---|---|---|---|
| Surlyn 7940 | 55 | 55 | 50 |
| Surlyn 8320 | 45 | — | — |
| Exact 4033 | — | 45 | 40 |
| ATX 320 | — | — | 10 |
| White concentrate | 5 | 5 | 5 |
| Physical Properties | | | |
| Tensile strength at break*, psi | 2792 | 3425 | 3455 |
| Tensile strain at break*, | 570 | 777 | 763 |
| Tensile modulus*, kpsi | 14.2 | 13.1 | 13.3 |

Note: *Tensile properties were measured from the ball covers instead of molded specimens.

A significant increase in the spin rate from the driver is indicated for the blends containing EXACT® 4033 in comparison to a blend containing the low modulus SURLYN® 8320 (see Table V).

Further, initial velocity and coefficient of restitution results were found to be slightly better for blends containing an ionomer and an ethylene polymer such as those containing the EXACT® 4033 component than the low modulus SURLYN® 8320 component.

TABLE V

Comparison of various golf ball properties of blends based on Surlyn 7940 ® with Surlyn ® 8320 and Exact ® 4033

| Physical and Ball Properties | Blend 6 | Blend 7 | Blend 8 |
|---|---|---|---|
| Hardness (Shore-D) | 60 | 60 | 57 |
| PGA compression | 105 | 105 | 105 |
| Spin rate from the driver, rpm | 3526 | 3871 | 3896 |
| Spin rate from the 5-iron, rpm | 7974 | 8623 | 8568 |
| Initial velocity, ft/sec | 252.3 | 253.0 | 252.8 |
| Coefficient of restitution | 0.804 | 0.807 | 0.808 |
| Durability at room temperature, # hits | 400 | 400 | 400 |
| Number of balls failed after durability test | none | none | none |

It appears from the above study that the presence of ATX 320® did not contribute to further improvements in the ball properties.

In comparing balls with covers made from 52.4 weight percent Surlyn 7940/42.9 weight percent Surlyn 8320 to balls with covers in which the Surlyn 8320 was replaced by Exact 4033 or by Exact 4033 with Fusabond MB-110D, 226D or 280D, the balls with Exact 4033 had both a higher spin rate and better durability, as shown in Table VI. Thus, the 52.4 weight percent Surlyn 7940/42.9 weight percent Surlyn 8320 had a spin rate of 3362 rpm when hit by a driver/8657 rpm when hit by an 8-iron, while the 52.4 weight percent Surlyn 7940/42.9 weight percent Exact 4033 had corresponding spin rates of 3619 and 9150 rpm. In the hit test at room temperature, cracking was observed after 650 hits for the Surlyn 7940/Surlyn 8320 blend, but only after 1000 hits for the Surlyn 7940/Exact 4033 blend.

TABLE VI

Comparison of Golf Ball Properties For Blends of Surlyn 7940, Surlyn 8320 with Exact 4033, FUSABOND Polymers

| I. Ingredients | #9 | #10 | #11 | #12 | #13 |
|---|---|---|---|---|---|
| Surlyn 7940 (15% Acid Ionomer-Li) | 55 | 55 | 55.0 | 55.0 | 55.0 |
| Surlyn 8320 (15% Acid Ionomer-Na) | 45 | — | — | — | — |
| Exact 4033 | — | 45 | 45.0 | 45.0 | 45.0 |
| Fusabond MB-110 D (Ethylene - 0.9 wt. % maleic anhydride melt flow index 30) | — | — | 10.0 | — | — |
| Fusabond MB-226D (Ethylene - 0.9 wt. % maleic anhydride meltflow index 1.5). | — | — | — | 10.0 | — |
| Fusabond MB-280D (EPDM with 2% maleic anhydride m.I.5.0) | — | — | — | — | 10.0 |
| White Concentrate | 5.0 | 5.0 | 5.0 | 5.0 | 5.0 |
| II. Performance | | | | | |
| Hit Test at RT (50% fail) | 650 | 1000 | over 1000 | over 1000 | over 1000 |
| Cold Crack Test at 5° F. | No fail | No fail | No fail | No fail | No fail |
| Spin Rate from Driver (rpm) | 3362 | 3619 | 3408 | 3436 | 3599 |
| Spin Rate from 8 - Iron (rpm) | 8657 | 9150 | 8770 | 8753 | 9078 |

The information in Table VII establishes that low modulus Surlyn materials can be replaced by polymers discussed herein with little change in spin rate.

TABLE VII

Comparison of Golf Ball Properties Of Surlyn ® Blends With Affinity ® PF 1140

| Ingre- dients | Surlyn 7940 | Surlyn 8320 | Affinity PF1140 | White Concen- trate | Spin Rate Driver (rpm) | Flex Modulus |
|---|---|---|---|---|---|---|
| A#1 | 92.5 | 7.5 | — | 5 | 3216 | 62.2 ± 1.67 |
| A#2 | 92.5 | 3.75 | 3.75 | 5 | 3304 | 55.9 ± 1.20 |
| A#3 | 85 | 15 | — | 5 | 3348 | 54.8 ± 1.70 |
| A#4 | 85 | 10 | 5 | 5 | 3221 | 56.4 ± 2.80 |
| A#5 | 85 | 7.5 | 7.5 | 5 | 3307 | 57.2 ± 2.60 |
| A#6 | 77.5 | 22.5 | — | 5 | 3281 | 46.8 ± 2.80 |
| A#7 | 77.5 | 15.0 | 7.5 | 5 | 3317 | 50.8 ± 1.40 |
| A#8 | 77.5 | 11.25 | 11.25 | 5 | 3346 | 48.7 ± 2.1 |
| A#9 | 55 | 45 | — | 5 | 3489 | 27.1 ± 2.2 |
| A#10 | 55 | 37.5 | 7.5 | 5 | 3421 | 24.6 ± 1.8 |
| A#11 | 55 | 30 | 15 | 5 | 3607 | 22.7 ± 2.9 |
| A#12 | 55 | 22.5 | 22.5 | 5 | 3497 | 23.4 ± 2.4 |
| A#13 | 95 | — | 5 | 5 | 3146 | 64.2 ± 3.4 |
| A#14 | 90 | — | 10 | 5 | 3288 | 68.1 ± 2.6 |

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments as falling within the true spirit and scope of the present invention.

We claim:

1. A golf ball comprising a cover and a core, the cover having at least one foamed layer, the foamed layer formed of a metallocene catalyzed polymer blend, comprising at least one metallocene catalyzed polymer and at least one ionomer, wherein the metallocene catalyzed polymer is of the formula:

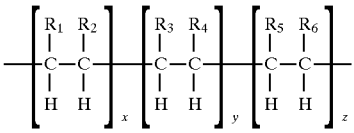

wherein

R$_1$ is hydrogen, aromatic, heterocyclic, or lower alkyl selected from the group consisting of CH$_3$, C$_2$H$_5$, C$_3$H$_7$, and C$_4$H$_9$;

R$_2$ is hydrogen, aromatic, heterocyclic, or lower alkyl selected from the group consisting of CH$_3$, C$_2$H$_5$, C$_3$H$_7$, C$_4$H$_9$, and C$_5$H$_{11}$;

R$_3$ is hydrogen or lower alkyl selected from the group consisting of CH$_3$, C$_2$H$_5$, C$_3$H$_7$, C$_4$H$_9$, and C$_5$H$_{11}$;

R$_4$ is selected from the group consisting of H, CH$_3$, C$_2$H$_5$, C$_3$H$_7$, C$_4$H$_9$, C$_5$H$_{11}$, C$_6$H$_{13}$, C$_7$H$_{15}$, C$_8$H$_{17}$, C$_9$H$_{19}$, C$_{10}$H$_{21}$, and phenyl, in which from 0 to 5 H within R$_4$ can be replaced by substituents selected from the group consisting of COOH, SO$_3$H, NH$_2$, F, Cl, Br, I, OH, SH, silicone, lower alkyl esters and lower alkyl ethers, with the proviso that R$_3$ and R$_4$ can be combined to form a bicyclic ring;

R$_5$ is hydrogen, lower alkyl including C$_1$–C$_5$, carbocyclic, aromatic or heterocyclic;

R$_6$ is hydrogen, lower alkyl including C$_1$–C$_5$, carbocyclic, aromatic or heterocyclic; and wherein x ranges from 99 to 50 weight per cent of the polymer, y ranges from 1 to 50 weight per cent of the polymer and z ranges from 0 to 49 weight per cent of the polymer.

2. The golf ball according to claim 1, wherein the layer has a Shore D hardness of from about 15 to about 80.

3. The golf ball according to claim 1, wherein the layer has a thickness of from about 0.005 to about 0.125 inch.

4. The golf ball according to claim 1, wherein the core comprises at least one core layer, the core layer comprising a blend of from about 1 to about 100 phr of at least one metallocene catalyzed polymer and from about 99 to 0 phr of at least one ionomer, wherein the metallocene catalyzed polymer is of the formula:

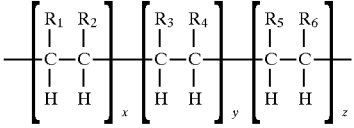

wherein

R$_1$ is hydrogen, aromatic, heterocyclic, or lower alkyl selected from the group consisting of CH$_3$, C$_2$H$_5$, C$_3$H$_7$, and C$_4$H$_9$;

R$_2$ is hydrogen, aromatic, heterocyclic, or lower alkyl selected from the group consisting of CH$_3$, C$_2$H$_5$, C$_3$H$_7$, and C$_4$H$_9$ or lower alkyl selected from the group consisting of CH$_3$, C$_2$H$_5$, C$_3$H$_7$, C$_4$H$_9$, and C$_5$H$_{11}$;

$R_3$ is hydrogen or lower alkyl selected from the group consisting of $CH_3$, $C_2H_5$, $C_3H_7$, $C_4H_9$, and $C_5H_{11}$;

$R_4$ is selected from the group consisting of H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic;

$R_6$ is hydrogen, lower alkyl including $C_1$–$C_5$, carbocyclic, aromatic or heterocyclic; and wherein x ranges from 99 to 50 weight per cent of the polymer, y ranges from 1 to 50 weight per cent of the polymer and z ranges from 0 to 49 weight per cent of the polymer.

5. The golf ball according to claim 4, wherein the core comprises a liquid center.

6. The golf ball according to claim 4, wherein the core layer has a foamed structure.

7. The golf ball according to claim 4, wherein the core layer has a Shore D hardness of from about 15 to about 80.

8. The golf ball according to claim 4, wherein the core has a diameter of from about 1.0 to about 1.63 inch, and the core layer has a thickness of from about 0.005 to about 0.125 inch.

9. The golf ball according to claim 1, further comprising a mantle situated between the cover and the core.

10. The golf ball according to claim 9, wherein the core comprises a liquid or solid center wrapped in elastomeric windings.

11. The golf ball according to claim 1, wherein the metallocene catalyzed polymer is chosen from the group consisting of polyethylene and copolymers of ethylene with butene, hexene, and octene.

12. The golf ball according to claim 1, wherein the metallocene catalyzed polymer has a flexural modulus of from about 500 psi to 200,000 psi, and the ionomer has a flexural modulus of from about 50 psi to about 150,000 psi.

13. The golf ball according to claim 1, wherein the metallocene catalyzed polymer blend has a foamed structure, and, further wherein the metallocene polymer blend has a flexural modulus of from about 1000 to about 150,000 psi.

14. A golf ball comprising a cover and a core and a mantle situated between the cover and the core, wherein at least one of the cover, the core, and the mantle comprises at least one layer, the layer formed of a metallocene catalyzed polymer blend, comprising from about 1 to about 100 phr of at least one metallocene catalyzed polymer and from about 99 to 0 phr of at least one ionomer, wherein the metallocene catalyzed polymer is of the formula:

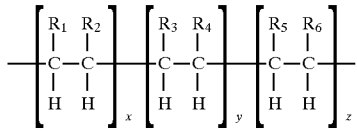

wherein $R_1$ is hydrogen, aromatic, heterocyclic, or lower alkyl selected from the group consisting of $CH_3$, $C_2H_5$, $C_3H_7$, and $C_4H_9$;

$R_2$ is hydrogen, aromatic, heterocyclic, or lower alkyl selected from the group consisting of $CH_3$, $C_2H_5$, $C_3H_7$, and $C_4H_9$ or lower alkyl selected from the group consisting of $CH_3$, $C_2H_5$, $C_3H_7$, $C_4H_9$, and $C_5H_{11}$;

$R_3$ is hydrogen or lower alkyl selected from the group consisting of $CH_3$, $C_2H_5$, $C_3H_7$, $C_4H_9$, and $C_5H_{11}$;

$R_4$ is selected from the group consisting of H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, and phenyl, in which from 0 to 5 H within $R_4$ can be replaced by substituents selected from the group consisting of COOH, $SO_3H$ $NH_2$, F, Cl, Br, I, OH, SH, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic;

$R_6$ is hydrogen, lower alkyl including $C_1$–$C_5$, carbocyclic, aromatic or heterocyclic; and wherein x ranges from 99 to 50 weight per cent of the polymer, y ranges from 1 to 50 weight per cent of the polymer and z ranges from 0 to 49 weight per cent of the polymer.

15. The golf ball according to claim 14, wherein the layer has a foamed structure.

16. The golf ball according to claim 14, wherein the metallocene catalyzed polymer is chosen from the group consisting of copolymers of ethylene with butene, hexene, and octene.

17. The golf ball according to claim 11, wherein the metallocene catalyzed polymer is a copolymer of ethylene with 1-butene.

18. The golf ball according to claim 14, wherein the layer forms at least a portion of the mantle.

19. The golf ball according to claim 18, wherein the core has a diameter of from about 1 to about 1.63 inch, the cover has a thickness of from about 0.005 to about 0.125 inch, and the mantle has a thickness of from about 0.005 to about 0.125 inch.

20. A golf ball comprising a cover and a core, the core having at least one layer, the layer formed of a metallocene catalyzed polymer blend, comprising from about 1 to about 100 phr of at least one metallocene catalyzed polymer and from about 99 to 0 phr of at least one ionomer, wherein the metallocene catalyzed polymer is of the formula:

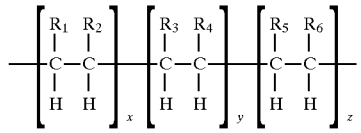

wherein $R_1$ is hydrogen, aromatic, heterocyclic, or lower alkyl selected from the group consisting of $CH_3$, $C_2H_5$, $C_3H_7$, and $C_4H_9$;

$R_2$ is hydrogen, aromatic, heterocyclic, or lower alkyl selected from the group consisting of $CH_3$, $C_2H_5$, $C_3H_7$, and $C_4H_9$ or lower alkyl selected from the group consisting of $CH_3$, $C_2H_5$, $C_3H_7$, $C_4H_9$, and $C_5H_{11}$;

$R_3$ is hydrogen or lower alkyl selected from the group consisting of $CH_3$, $C_2H_5$, $C_3H_7$, $C_4H_9$, and $C_5H_{11}$;

$R_4$ is selected from the group consisting of H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic;

$R_6$ is hydrogen, lower alkyl including $C_1$–$C_5$, carbocyclic, aromatic or heterocyclic; and wherein x ranges from 99 to 50 weight per cent of the polymer, y ranges from 1 to 50 weight per cent of the polymer and z ranges from 0 to 49 weight per cent of the polymer.

21. The golf ball according to claim 20, wherein the layer has a foamed structure.

22. The golf ball according to claim 20, wherein the cover comprises a density increasing filler material.

23. The golf ball according to claim 20, wherein the core comprises a liquid center.

24. The golf ball according to claim 20, wherein the layer has a Shore D hardness of from about 15 to about 80.

25. The golf ball according to claim 20, wherein the core has a diameter of from about 1.0 to about 1.63 inch, and the layer has a thickness of from about 0.005 to about 0.125 inch.

26. The golf ball according to claim 20, wherein the metallocene catalyzed polymer is chosen from the group consisting of copolymers of ethylene with butene, hexene, and octene.

27. The golf ball according to claim 26, wherein the metallocene catalyzed polymer is a copolymer of ethylene with 1-butene.

28. The golf ball according to claim 16, wherein the metallocene catalyzed polymer is a copolymer of ethylene with 1-butene.

29. A golf ball comprising at least one layer, the layer formed of a metallocene catalyzed polymer blend, comprising from about 1 to about 100 phr of at least one metallocene catalyzed polymer and from about 99 to 0 phr of at least one ionomer, wherein the metallocene catalyzed polymer comprises a copolymer of ethylene or propylene with butene, hexene, or octene.

30. The golf ball according to claim 29, wherein the metallocene catalyzed polymer further comprises functional groups introduced by a post-polymerization reaction.

31. The golf ball according to claim 30, wherein the functional groups introduced by a post-polymerization reaction include COOH, $SO_3H$, $NH_2$, anhydrides, and salts thereof, OH, SH, siloxane, and silicone functional groups.

* * * * *